(12) United States Patent
Mermoud

(10) Patent No.: US 7,255,481 B2
(45) Date of Patent: Aug. 14, 2007

(54) ROLLER BEARING WITH AIR PASSAGE IN A BORE PROVIDED WITH FLUTES

(75) Inventor: Gérard Mermoud, La Balme de Sillingy (FR)

(73) Assignee: S.N.R. Roulements, Annecy (FR)

( * ) Notice: Subject to any disclaimer, the term of this patent is extended or adjusted under 35 U.S.C. 154(b) by 137 days.

(21) Appl. No.: 11/151,655

(22) Filed: Jun. 14, 2005

(65) Prior Publication Data

US 2005/0276531 A1    Dec. 15, 2005

(30) Foreign Application Priority Data

Jun. 15, 2004    (FR) .................................. 04 51179

(51) Int. Cl.
 F16C 33/72    (2006.01)
 B60C 23/10    (2006.01)
(52) U.S. Cl. ...................... 384/486; 384/544; 152/417
(58) Field of Classification Search ................ 384/484, 384/486, 477, 544, 589; 152/415–417; 301/125, 301/131
See application file for complete search history.

(56) References Cited

U.S. PATENT DOCUMENTS

| | | | |
|---|---|---|---|
| 2,976,906 A | * | 3/1961 | Kamm et al. ................ 152/417 |
| 4,440,451 A | | 4/1984 | Goodell et al. |
| 4,932,451 A | * | 6/1990 | Williams et al. ............. 152/417 |
| 5,174,839 A | * | 12/1992 | Schultz et al. ............... 384/489 |
| 6,145,558 A | * | 11/2000 | Schmitz ....................... 152/416 |
| 6,668,888 B1 | * | 12/2003 | Beesley et al. ............. 152/417 |
| 2003/0217798 A1 | | 11/2003 | Ruetter et al. |
| 2004/0055291 A1 | | 3/2004 | Meydieu et al. |

FOREIGN PATENT DOCUMENTS

EP    0 224 674 A2    6/1987
FR    2 731 655 A1    9/1996

* cited by examiner

*Primary Examiner*—Thomas R. Hannon
(74) *Attorney, Agent, or Firm*—Arent Fox LLP

(57) ABSTRACT

A roller bearing for the rotational guidance of a motor vehicle wheel, the bearing comprising a rotating inner member, a fixed outer member and rolling bodies allowing their relative rotation about an axis. The inner member includes a bore on the periphery of which flutes are provided so as to allow the rotational coupling of a fluted shaft with the internal member. The bearing has a path forming an air passage having an outer channel and an inner channel designed to pass right through respectively each of the members, in which, in combination, the path has a groove formed by the omission of at least the front part of at least one flute, from an intermediate zone of the bore as far as its front face. The downstream end of the inner channel opens out in the groove.

20 Claims, 4 Drawing Sheets

ROLLER BEARING WITH AIR PASSAGE IN A BORE PROVIDED WITH FLUTES

The invention concerns a roller bearing for the rotational guidance of a motor vehicle wheel. Such a bearing typically comprises a rotating inner member on which the said wheel is intended to be associated, a fixed outer member intended to be fixed to the chassis of the said vehicle, and rolling bodies disposed between the said members so as to allow the relative rotation of the members about an axis.

The invention typically applies to a bearing intended to be used in combination with a system for checking and regulating the pressure of the tyre mounted on the wheel.

To do this, it is known how to provide a path forming an air passage between the fixed member and the rotating member of the bearing, so as to be able to supply air to the tyre from the chassis by means of the bearing.

In particular, the document U.S. Pat. No. 4,932,451 describes such a bearing in which the inner member comprises a bore on the periphery of which axially extending flutes are provided so as to allow the rotational coupling of a fluted shaft with the inner member by fitting the said shaft in the said bore.

This document provides for an annular space at the fitting together to enable air to circulate in the bore when the shaft is fitted in.

However, this solution is not fully satisfactory. This is because the geometry of the annular space depends on the position of the shaft in the bore, a position which may vary in manufacture or during the service life of the bearing because of the forces to which it is subjected. In addition, the annular space is formed partly by an annular clearance at the coupling, which is not satisfactory because of the forces that are transmitted between the shaft and the rotating member.

Thus the solution proposed by the document mentioned above poses in particular a problem of reliability of the bearing, both with regard to the air passage function since the geometry of the annular space cannot be controlled precisely, and with regard to the force transmission function.

The invention aims in particular to resolve this problem by proposing a roller bearing in which the path forming an air passage is produced locally at the bore in a particularly simple and limited way, and this with a known reproducible geometry.

To this end, the invention proposes a roller bearing for the rotational guidance of a motor vehicle wheel, the said bearing comprising a rotating inner member on which the said wheel is intended to be associated, a fixed outer member intended to be fixed to the chassis of the said vehicle, and rolling bodies disposed between the said members so as to allow the relative rotation of the said members about an axis, the inner member comprising a bore on the periphery of which axially extending flutes are provided so as to allow the rotational coupling of a fluted shaft with the inner member by the fitting of the said shaft in the said bore, the said bearing comprising a path forming an air passage between the outside of the fixed member and the front face of the rotating member, the said path comprising at least one outer channel and at least one inner channel designed to pass respectively right through each of the members, in which, in combination, the path also comprises a groove formed by the omission of at least the front part of at least one flute, from an intermediate zone of the bore as far as its front face, and the downstream end of the inner channel opens out in the said groove.

Other objects and advantages of the invention will emerge during the following description, given with reference to the accompanying drawings, in which.

Figure 1:
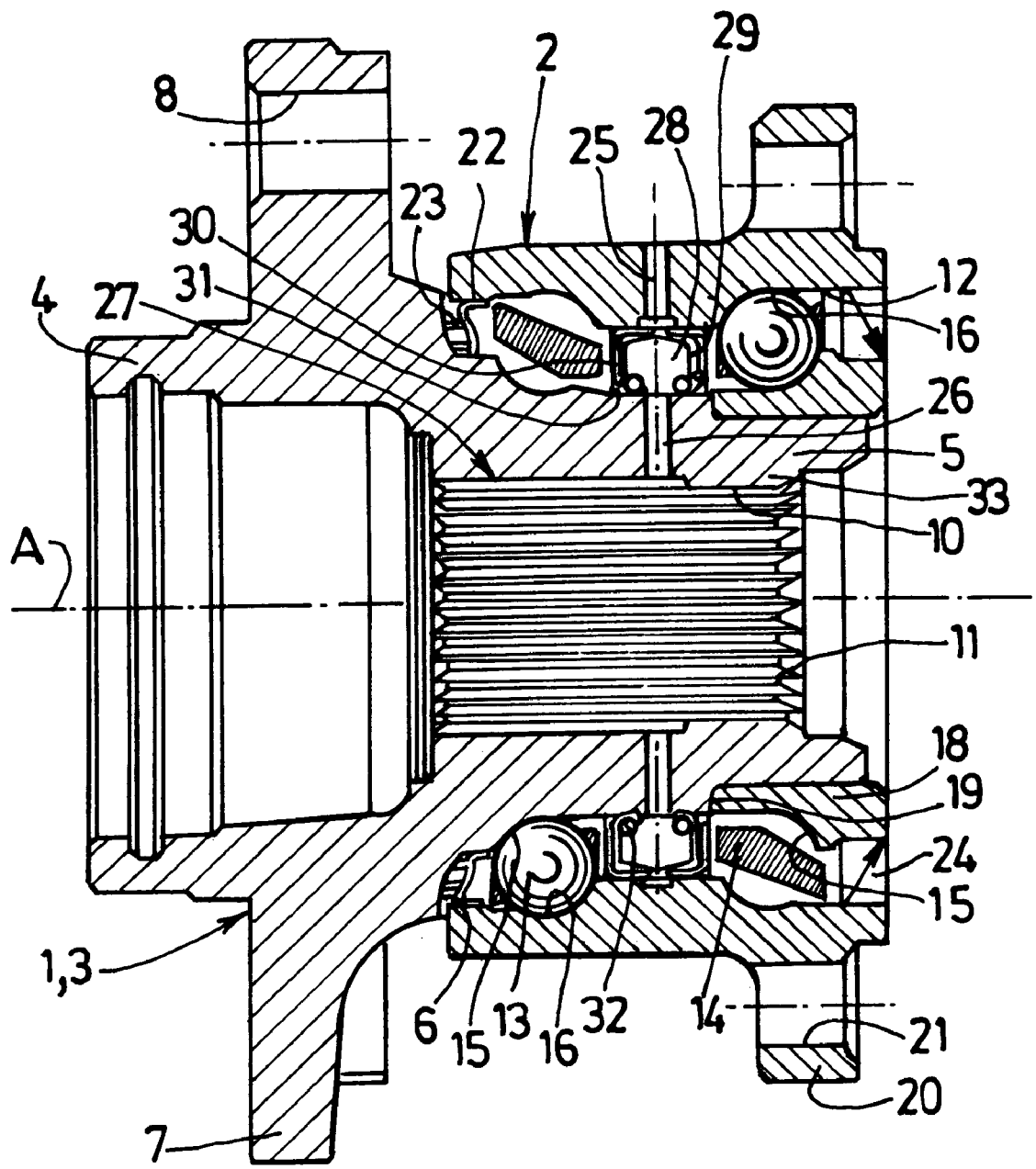
FIG. 1 is a view in longitudinal section of the roller bearing comprising a path forming an air passage according to one embodiment.

In relation to the figures, a roller bearing for the rotational guidance of a motor vehicle wheel is described.

The bearing comprises a rotating member 1 intended to transmit the rotation movement of a rotating shaft to the vehicle wheel and a fixed member 2 intended to be fixed to the vehicle chassis. The rotating member 1 is mounted for rotation about an axis A inside the fixed member 2.

In the remainder of the description, the terms "axial" or "longitudinal" and "radial" or "transverse" make reference to planes respectively parallel and perpendicular to the axis A. The terms "inner" and "outer" refer to longitudinal planes situated respectively close to and at a distance from the axis A. In addition, the terms "front" and "rear" refer to transverse planes situated respectively on the wheel side, namely the left hand side in FIG. 1, and on the drive shaft side, namely the right hand side in FIG. 1.

The rotating inner member 1 comprises a generally cylindrical hub 3 of axis A which comprises a front part 4 allowing the association of the vehicle wheel and a rear part 5 allowing the association of the drive shaft. The diameter of the front part 4 is greater than that of the rear part 5 so that the hub 3 has a shoulder 6.

Figure 2:
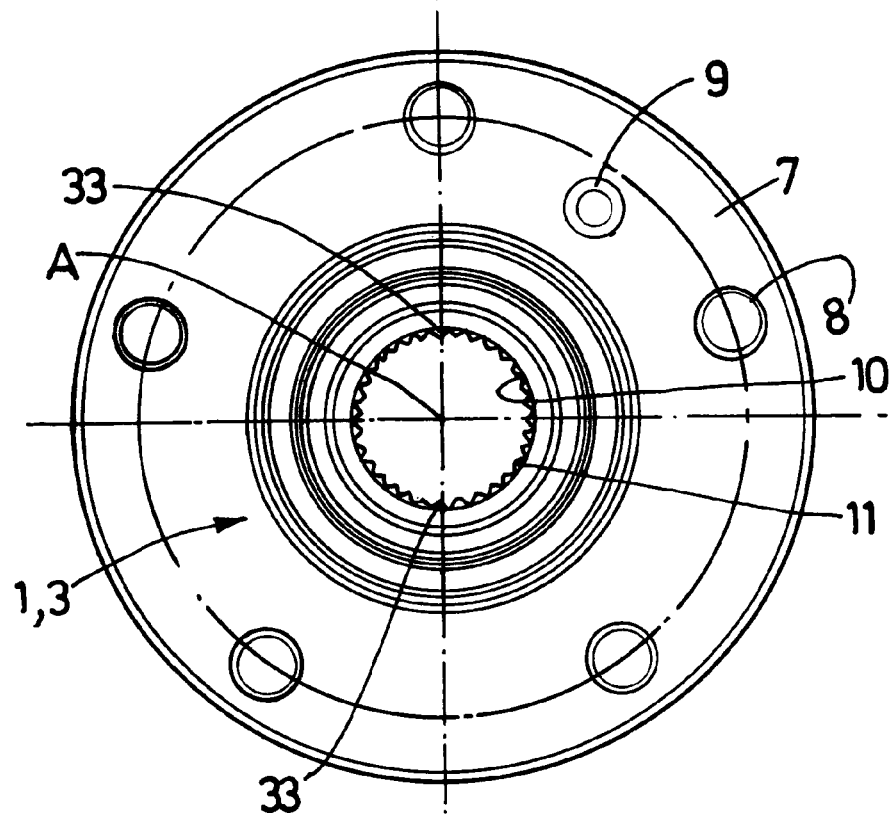
FIG. 2 is a view of the front face of the bearing of FIG. 1.
Figure 3:
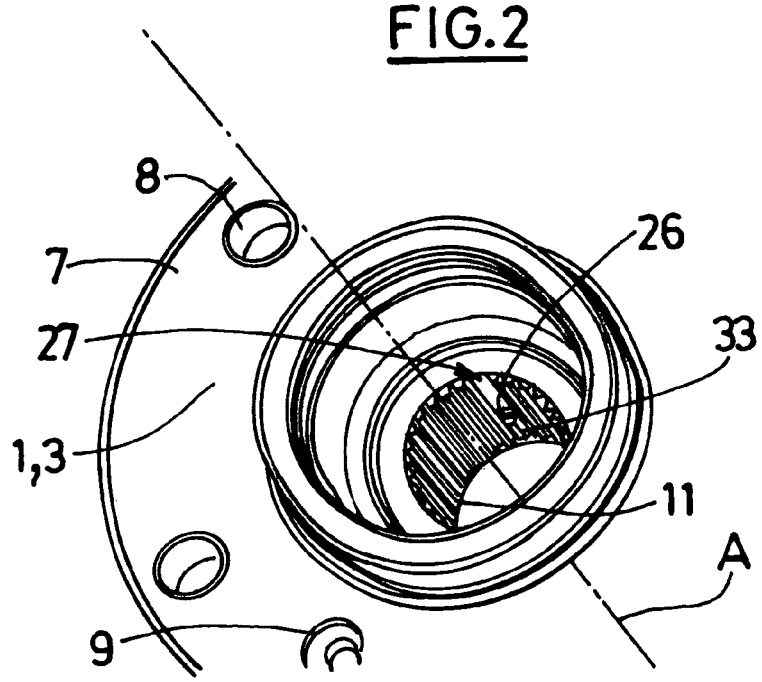
FIG. 3 is a partial perspective view of the bearing of FIG. 1, in which the downstream end of the inner channel of the air passage opening out at the rear end of the groove is displayed.

To enable the wheel to be fixed to the hub 3, the front part 4 comprises a fixing flange which is in the general form of an annular ring 7 extending radially from the outer surface of the front part 4. In FIGS. 1 and 2, axial fixing holes 8 are arranged on the ring 7 in order to be able to cooperate with members, such as bolts, for fixing the wheel to the hub 3. The ring 7 can also have a centring orifice 9 for the brake discs.

The rear part 5 of the hub 3 comprises an axial bore 10 centred on the axis A and on the periphery of which axially extending flutes 11 are provided. The flutes 11 are intended to allow the rotational coupling of the drive shaft having a fluted end with the hub 3 by fitting the fluted end in the bore 10.

The fixed outer member 2 is a generally cylindrical part whose axis is disposed coaxially with the axis A. The fixed member 2 also comprises a flange for fixing to the chassis formed by a radial ring 20 projecting from the outer surface of the fixed member 2 and provided with fixing holes 21. The fixed member 2 also has an axial bore 12 centred on the axis A in which the rear part 5 of the hub 3 is rotationally mounted.

In the embodiment depicted, the relative rotation of the hub 3 and fixed member 2 about the axis A is provided by two rows of rolling bodies, such as balls 13, spaced apart axially and disposed in a space between the hub 3 and the fixed member 2. The balls 13 are held at equal distances by a cage 14 and disposed between the inner 15 and outer 16 rolling tracks.

In FIG. 1, a front row of balls 13 is disposed between a front rolling track 15 produced on the outer surface of the rear part 5 of the hub 3 opposite a front rolling track 16 produced on the bore 12. In addition, a rear row of balls 13 is disposed between a rear rolling track 15 produced on an inner race 18 immobilised by fitting on the outer surface of the rear part 5 of the hub 3, the rear rolling track 15 being opposite a rear rolling track 16 produced on the bore 12.

To improve the positioning and immobilisation of the inner race 18 on the rear part 5, it is possible to provide machining of the outer surface of this part 5 so as to form a rear shoulder 19 forming a stop for the inner race 18. In addition, in other embodiments, not shown, the inner race 18 can comprise the two inner rolling tracks 15, the inner race 18 then being fitted on the outer surface of the rear part 5 and coming into abutment against the shoulder 6.

The balls 13 are arranged in an O-shaped mounting. In such a mounting, the distance between the surfaces of contact of the balls 13 with the outer rolling track 16 is less than the distance between the surfaces of contact of the balls 13 with the inner rolling tracks 15. This makes it possible in particular to move the point of application of the loads away outside the bearings, thus producing a rigid compact mounting.

The impermeability of the bearing at the front is produced by a seal 22 for example made from elastomer associated with the bore 12 and comprising lips 23 in contact with the rear part 5 of the hub 3 and the shoulder 6. At the rear, the impermeability is provided by a dynamic seal 24 disposed between the fixed member 2 and the inner race 18.

To allow the control and regulation of the pressure of the tyre mounted on the wheel, the bearing according to the invention comprises a path forming an air passage between the outside of the fixed member 2 and the front face of the hub 3.

In particular, the path comprises an outer channel 25 which extends substantially radially in the vicinity of a median transverse plane of the fixed outer member 2. In the embodiment depicted, the outer channel 25 is formed in the outer member 2 and comprises an upstream end opening out in the outer face of the outer member 2. The upstream end is intended to be connected to a system, not shown, for checking and regulating the pressure of the tyre mounted on the wheel. Such a system comprises in particular a compressor, solenoid valves, control devices for actuating and controlling the solenoid valve and the compressor so as to allow the inflation or deflation of the tyre. The outer channel 25 also comprises a downstream end opening out at the space between the rolling tracks 15, 16 in which the balls 13 are provided.

The air path also comprises two assemblies disposed symmetrically with respect to the rotation axis A and each comprising an inner channel 26 and a groove 27 in which the channel 26 opens out. Each inner channel 26 is formed in the hub 3 and extends substantially radially between an upstream end opening out in the space and a downstream end opening out at the rear end of the groove 27. Each groove 27 is arranged axially in the bore 10 and has an opening on the front face of the bore 10 so as to allow the supply of air to the tyre by means of a system that is not shown.

Thus the air path makes it possible to put the checking and regulation system and the tyre valve in sealed communication so as to be able to supply air to the said tyre.

For other embodiments in which the rotating 1 and fixed 2 members comprise several assembled elements, the inner 26 and outer 25 channels are designed to pass right through respectively each of the members 1, 2, and in particular the elements which make them up, in order to be able to provide the air passage function between the outside of the fixed member 2 and the front face of the moving member 1.

Moreover, in order to put in air communication the downstream and upstream ends of respectively the outer 25 and inner 26 channels, the air path comprises a sealed annular chamber 28 provided between the rows of balls 13.

In FIG. 1, the chamber 28 is formed between two adjacent seals 29 disposed on each side of the downstream and upstream ends of respectively the outer 25 and inner 26 channels. The seals 29 comprise a rigid frame 30 associated with the outer member 2, for example by fitting in, and an elastomeric sealing lip 31 which is moulded onto the frame 30 in order to come into rubbing contact on the hub 3. The elastomeric lip 31 is held in rubbing contact on the hub 3 by an elastic means of the spring type formed for example by a ring 32.

According to the invention, each groove 27 is formed by the omission of at least the front part of at least one flute 11, from an intermediate zone of the bore 10 as far as its front face.

According to one embodiment, this intermediate zone has a length adapted to satisfy the requirements relating to the combination of the two functions fulfilled by the bearing, namely the function of transmitting a rotation force from the rotating shaft to the wheel and the air passage function, whilst complying with the constraints related to the available space and mechanical strength. To do this, provision is in particular made for the intermediate zone to be situated substantially at a distance from the front face that is between 30% and 70% of the axial dimension of the bore 10. In particular, in FIG. 1, the intermediate zone is situated substantially at a distance from the front face that is greater than half the axial dimension of the bore 10.

In addition, in order to be able to achieve in combination the transmission of the rotation forces and the passage of air in a reduced size and without reducing the mechanical strength, the rear part 33 of the flutes 11 in which the groove 27 is formed has a geometry in transverse section, displayed in FIG. 2, which is similar to that of the other flutes 11.

Figure 4:
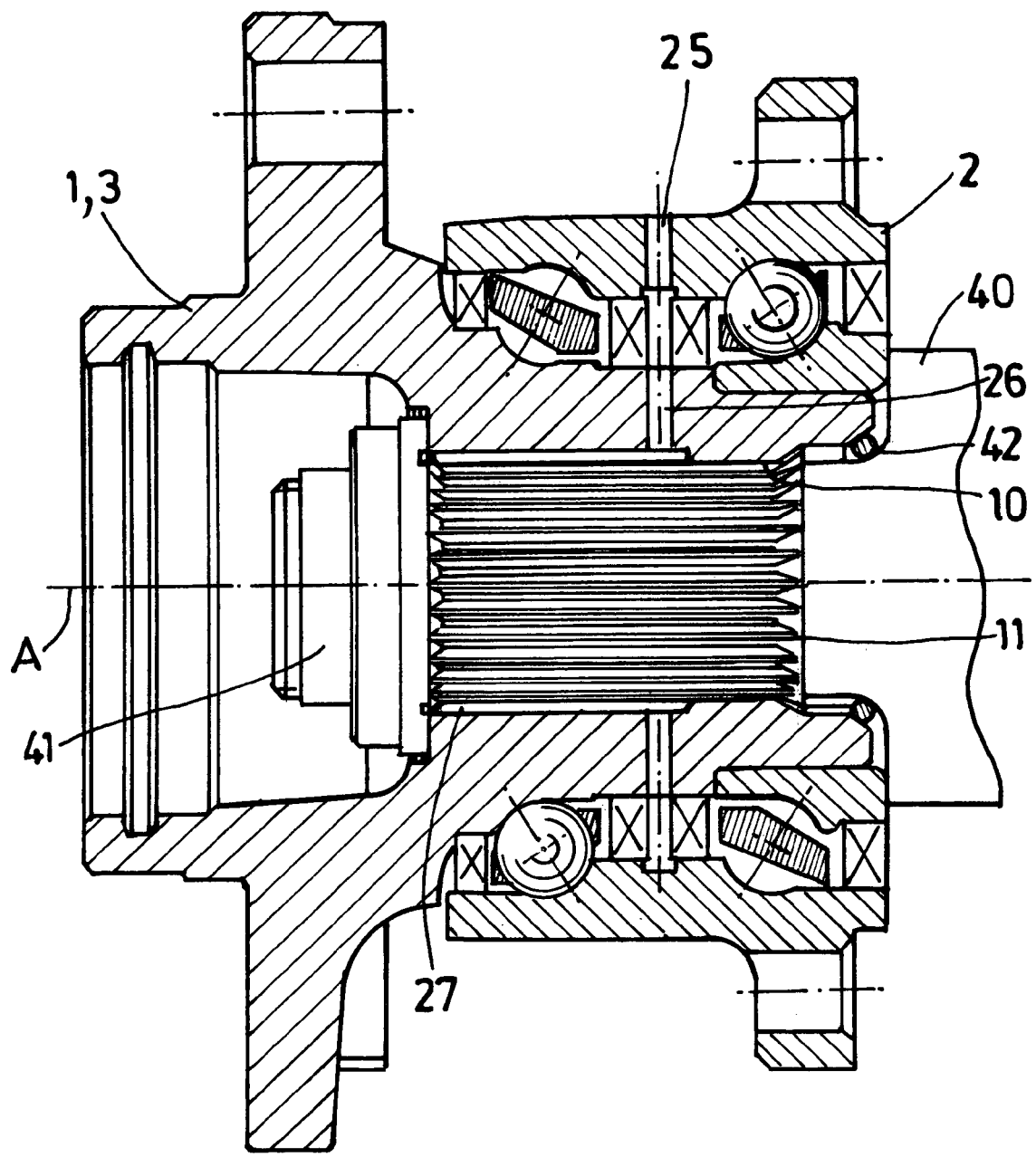
FIG. 4 is a view in longitudinal section of the roller bearing of FIG. 1, in the bore of which a shaft is disposed.

FIG. 4 depicts a mounting comprising a drive shaft 40 fitted in the bore 10 and immobilised axially therein by means of a clamping nut 41. The shaft 40 comprises flutes arranged to cooperate with the flutes 11 in the bore 10 so as to transmit the rotation forces. In this embodiment, the air path of the bore 10 is formed in the space formed between the periphery of the shaft 10 and the groove 27. In addition, a rear sealing means, in the form of an O-ring seal 42, is provided between the hub 3 and the shaft 40, so as to prevent leaks of air from the groove 27 to the rear face of the bore 10.

Figure 5:
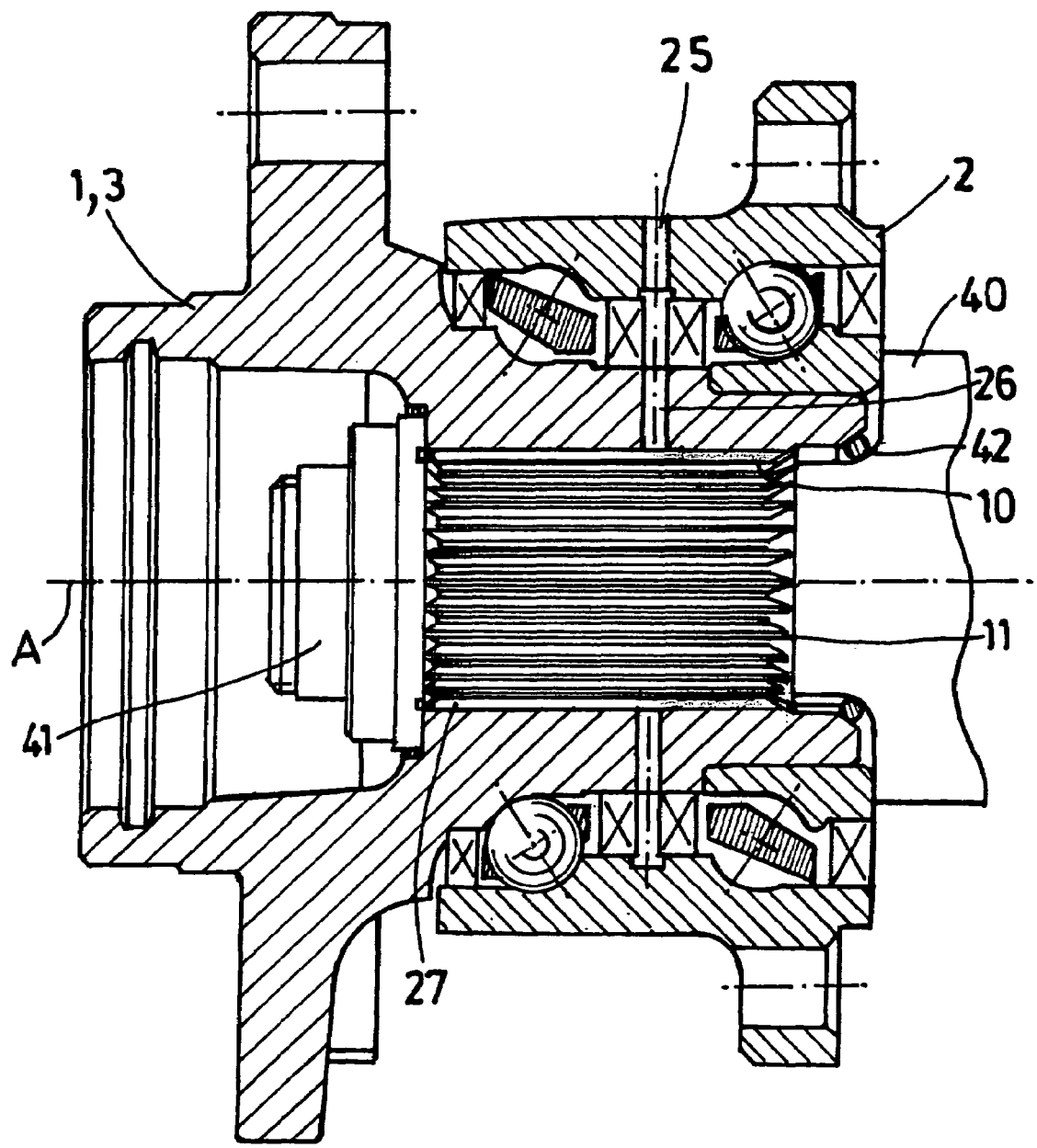
FIG. 5 is a view in longitudinal section of the roller bearing in which a flute is omitted over its entire length from the bore.

According to another embodiment shown in FIG. 5, it is possible to make provision for omitting at least one flute 11 over its entire length, the groove 27 then being produced over the entire axial dimension of the said flute. In this embodiment, the force transmission function is then provided at the other flutes 11.

The invention claimed is:

1. A roller bearing for the rotational guidance of a motor vehicle wheel, the bearing comprising a rotating inner member on which the wheel is intended to be associated, a fixed outer member intended to be fixed to the chassis of the said vehicle, and rolling bodies disposed between the members so as to allow the relative rotation of the members about an axis (A), the inner member comprising a bore on the periphery of which axially extending flutes are provided so as to allow the rotational coupling of a fluted shaft with the inner member by the fitting of the shaft in the said bore, the bearing comprising a path forming an air passage between the outside of the fixed member and the front face of the rotating member, the path comprising at least one outer channel and at least one inner channel designed to pass respectively right through each of the members, the bearing being characterised in that, in combination, the path also comprises a groove formed by the omission of at least a front part of at least one flute, from an intermediate zone of the bore as far as its front face, and the downstream end of the inner channel opens out in the groove.

2. A roller bearing according to claim 1, characterised in that the inner channel opens out in the rear end of the groove.

3. A roller bearing according to claim 2, characterised in that the intermediate zone is situated substantially at a distance from the front face that is between 30% and 70% of the axial dimension of the bore.

4. A roller bearing according to claim 3, characterised in that the rear part of the flute in which the groove is formed has a geometry in transverse section that is similar to that of the other flutes.

5. A roller bearing according to claim 2, characterised in that the rear part of the flute in which the groove is formed has a geometry in transverse section that is similar to that of the other flutes.

6. A roller bearing according to claim 1, characterised in that the intermediate zone is situated substantially at a distance from the front face that is between 30% and 70% of the axial dimension of the bore.

7. A roller bearing according to claim 6, characterised in that the rear part of the flute in which the groove is formed has a geometry in transverse section that is similar to that of the other flutes.

8. A roller bearing according to claim 6, characterised in that the inner channel opens out in the groove at its rear end, and that the rear part of the flute in which the groove is formed has a geometry in transverse section that is similar to that of the other flutes.

9. A roller bearing according to claim 1, characterised in that a rear part of the flute in which the groove is formed has a geometry in transverse section that is similar to that of the other flutes.

10. A roller bearing according to claim 1, characterised in that at least one flute is omitted over its entire length so as to form a groove.

11. A roller bearing according to claim 1, characterised in that the inner and outer channels extend substantially radially.

12. A roller bearing according to claim 1, characterised in that the outer channel comprises an upstream end opening out in the outer face of the fixed member and a downstream end opening out at the a space in which the rolling bodies are provided, the inner channel comprising an upstream end opening out in the space, the air path also comprises a sealed annular chamber provided in the space in order to put in air communication the downstream and upstream ends of respectively the outer and inner channels.

13. A roller bearing according to claim 12, characterised in that the chamber is formed between two adjacent seals which are, on each side of the downstream and upstream ends of respectively the outer and inner channels, firstly associated with the fixed member and secondly disposed in rubbing contact on the rotating member.

14. A roller bearing according to claim 13, characterised in that it comprises two rows of rolling bodies that are spaced apart axially, the annular chamber being provided between the rows.

15. A roller bearing according to claim 13, characterised in that the seals comprise a rigid frame fitted on the fixed member and an elastomeric sealing lip, moulded onto the frame in order to come into rubbing contact on the rotating member.

16. A roller bearing according to claim 15, characterised in that it comprises two rows of rolling bodies that are spaced apart axially, the annular chamber being provided between the rows.

17. A roller bearing according to claim 12, characterised in that it comprises two rows of rolling bodies that are spaced apart axially, the annular chamber being provided between the rows.

18. A roller bearing according to claim 1, characterised in that the air path comprises an outer channel and two assemblies each comprising an inner channel and a groove in which the channel opens out, the assemblies being disposed symmetrically with respect tot he rotation axis (A).

19. A roller bearing according to claim 1, characterised in that the fixed member comprises at least one outer rolling track and a flange for fixing to the chassis, the rotating member comprising a hub on which at least one inner race is immobilised, comprising an inner rolling track disposed opposite the outer rolling track, the hub comprising a fixing flange for the wheel.

20. A roller bearing according to claim 19, characterised in that the inner channel is formed in the hub.

* * * * *